(No Model.)

H. NADORFF.
FAUCET AND BUSHING.

No. 326,319. Patented Sept. 15, 1885.

WITNESSES.
Frank Pardow.
George Hammer.

INVENTOR.
Henry Nadorff
by Frank Sheehy

UNITED STATES PATENT OFFICE.

HENRY NADORFF, OF LOUISVILLE, KENTUCKY.

FAUCET AND BUSHING.

SPECIFICATION forming part of Letters Patent No. 326,319, dated September 15, 1885.

Application filed November 11, 1884. (No model.)

*To all whom it may concern:*

Be it known that I, HENRY NADORFF, a citizen of United States, residing at Louisville, in the county of Jefferson and State of Kentucky, have invented certain new and useful Improvements in Faucets and Bushings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in faucets and taps for beer and other liquors; and it consists in the construction and novel arrangement of devices, as will be hereinafter more fully set forth, and pointed out in the claim appended.

Figure 1:
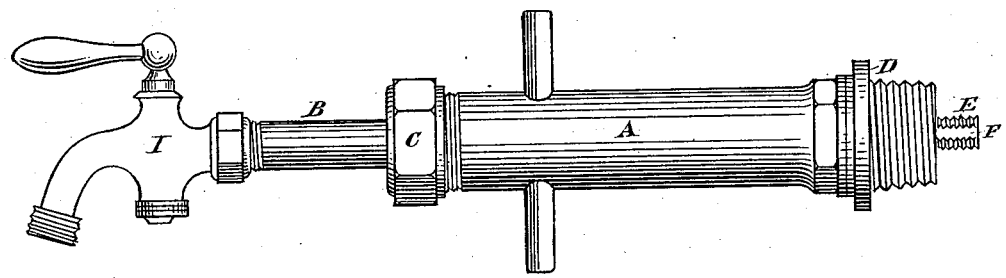
Figure 2:
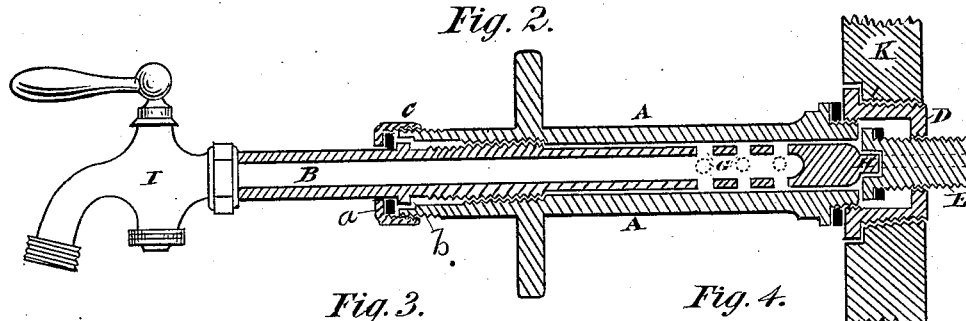
Figure 3:
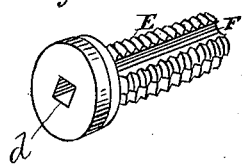
Figure 4:
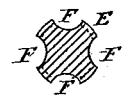

In the accompanying drawings, Figure 1 is a representation of my improved faucet with all its parts connected and ready for use. Fig. 2 is a longitudinal sectional view of the same, showing it applied to a portion of a barrel-head. Fig. 3 is a perspective view of the bush-valve, and Fig. 4 is a cross-sectional view of the same.

Referring to the said drawings by letter, A indicates a sleeve surrounding the draft-tube. This sleeve is provided with external screw-threads at its inner end, and adjacent thereto an annular flange adapted to engage the face of the bushing D when the said sleeve is screwed into the internally-threaded bushing, the bushing also having external threads for engaging the aperture of a vessel. The opposite or outer end of this sleeve is externally threaded to receive a packing-gland, *c*, the same being internally threaded and arranged upon the draft-tube, so as to engage and tightly press a washer or packing-ring, *a*, against an annular flange, *b*, on the draft-tube and prevent the escape of any liquid which may pass or work beyond the engaging-threads of the tube and sleeve, and thereby effectually prevent any leakage of the faucet.

B indicates the draft-tube, which is externally threaded beyond the annular flange *b* thereof to engage internal threads of the sleeve A. This tube is provided near its inner end with a plurality of apertures for the passage of liquid, and the said end terminates in a rectangular hub or projection, H, which is adapted to engage and operate the bushing-valve E. The bushing D may be of any ordinary construction, having its inner end provided with an internally-threaded aperture to receive the said valve E, which is externally threaded. This valve is provided with an enlarged head having a central rectangular horizontal recess, *d*, to receive the conformably-shaped extension H of the draft-tube, and the stem of the said valve is fluted or provided with longitudinal channels F, for conveying the liquid from the vessel to the sleeve, from whence it is directed through the apertures G and out through the draft-tube to the spigot I.

From the foregoing description it will be readily perceived that the bushing is designed to remain in a vessel after once placed therein, and when the screw-valve is driven home the vessel is sealed. Therefore to tap the vessel it is first necessary to screw the inner end of the sleeve into the threaded bushing, after which the inner rectangular portion of the draft-tube is inserted into the rectangular recess of the bushing-valve and the same turned so as to draw its head from the bush, which will open the channels of the stem.

What I claim is—

The combination, with the bushing D, threaded and perforated, as shown, and the part-threaded valve E, operating through the bushing and having a rectangular aperture, of the sleeve A, engaging the bushing by thread and packing, the faucet B, passing through the sleeve and having a perforated body and a closed square end to engage the valve, all constructed and operating as set forth.

In testimony whereof I affix my signature in presence of two witnesses.

HENRY NADORFF.

Witnesses:
 FRANK PARDON,
 GEORGE HAMMER.